(12) United States Patent
Wernersson (10) Patent No.: US 7,699,543 B2
(45) Date of Patent: Apr. 20, 2010

(54) CAMERA FUNCTION ACTUATOR (75) Inventor: Mats Wernersson, Helsingborg (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1095 days.

(21) Appl. No.: 11/357,179

(22) Filed: Feb. 21, 2006

(65) Prior Publication Data

US 2007/0198138 A1  Aug. 23, 2007

(51) Int. Cl.
G03B 17/00 (2006.01)

(52) U.S. Cl. .................................... 396/448
(58) Field of Classification Search .................. 396/448
See application file for complete search history.

(56) References Cited

U.S. PATENT DOCUMENTS

| | | | |
|---|---|---|---|
| 4,860,040 A * | 8/1989 | Tamamura et al. ............ | 396/89 |
| 5,459,544 A | 10/1995 | Emura | |
| 6,434,333 B2 * | 8/2002 | Tanaka et al. ............... | 396/132 |
| 6,449,436 B1 * | 9/2002 | Fuss ........................... | 396/208 |
| 6,459,855 B1 * | 10/2002 | Kosaka et al. ............... | 396/177 |
| 6,516,146 B1 * | 2/2003 | Kosaka ........................ | 396/55 |
| 6,554,501 B2 * | 4/2003 | Kosaka et al. ............... | 396/452 |
| 2004/0169772 A1 | 9/2004 | Matsui et al. | |

FOREIGN PATENT DOCUMENTS

JP   2001141973   5/2001

OTHER PUBLICATIONS

International Preliminary Report on Patentability dated Jul. 30, 2008 issued in corresponding international application No. PCT/IB2006/002271, 8 pages.
PCT Search Report and Written Opinion, Jan. 29, 2007, 13 pages.

* cited by examiner

*Primary Examiner*—Rodney E Fuller
(74) *Attorney, Agent, or Firm*—Harrity & Harrity, LLP (57) ABSTRACT

An actuator for use with a camera may include a wire and a first member coupled to the wire. The actuator may also include a second member coupled to the first member and a power source to supply power to the wire. When power is supplied to the wire, the wire may exert a force on the first member to move the first member and the second member and perform a function associated with the camera.

24 Claims, 7 Drawing Sheets

CAMERA FUNCTION ACTUATOR

TECHNICAL FIELD OF THE INVENTION

The invention relates generally to cameras and, more particularly, to actuating a camera function.

DESCRIPTION OF RELATED ART

Communication devices, such as cellular telephones, have become increasingly versatile. For example, cellular telephones often include cameras that enable a user to take pictures and transmit these pictures. Due to every day use, the camera lens often becomes scratched and dirty. Over time, scratches and dirt may affect the quality of pictures taken by the camera.

Some cellular telephones use a manual button to control actuation of a lens cover. A drawback with using such a button to open and close the lens cover is that the button takes up space on the cellular telephone body. As the size of cellular telephones become smaller, it is often difficult to include such a lens cover button. Therefore, lens covers are often omitted from cellular telephones due to constraints associated with providing such buttons.

SUMMARY

According to one aspect, a system for use with a mobile terminal that includes a camera may be provided. The system includes at least one wire, a first member coupled to the at least one wire and a second member coupled to the first member. The system may also include a power source configured to supply power to a first one of the at least one wire. When power is supplied to the first wire, the first wire is configured to exert a force on the first member to move the first member and the second member and perform a function associated with the camera.

Additionally, the function may comprise covering or uncovering a lens and the second member includes a lens cover.

Additionally, the at least one wire may comprises the first wire and a second wire, where the first wire is connected to the first member at a first location and the second wire is connected to the first member at a second location, where the first and second locations are located on opposite sides of a point about which the first member is configured to move.

Additionally, the second member may be configured to move to uncover a lens of the camera when power is supplied to the first wire and move to cover the lens when power is supplied to the second wire.

Additionally, the system may include processing logic configured to control the power source to supply power to the first wire to uncover a lens when a camera mode is selected and control the power source to supply power to the second wire to cover the lens when the camera mode is deactivated or when a user powers down the mobile terminal.

Additionally, the system may include at least one switch and processing logic coupled to a first one of the at least one switch. The processing logic may be configured to provide a control signal to the first switch to control application of power from the power source to the first wire.

Additionally, the at least one wire may comprise an alloy that contracts when the alloy is heated to a predetermined temperature.

Additionally, the at least one wire may comprise a first wire and a second wire. The system may further comprise a latching device configured to secure the second member in a first position when power is applied to the first wire and secure the second member in a second position when power is applied to the second wire.

Additionally, the system may comprise at least one safety device coupled to the at least one wire, the safety device being configured to dissipate force when the function associated with the camera cannot be performed.

Additionally, the function may comprise a macro function or an autofocus function and the second member may include a lens.

Additionally, the function may comprise a night vision function and the second member may include a filter.

According to another aspect, a system may include logic configured to receive information representing selection of a camera related function. The system may also include a first wire, a device coupled to the first wire and a power source configured to supply power to the first wire under control of the logic. When power is supplied to the first wire, the first wire is configured to exert a force on the device to move the device and perform the camera related function.

Additionally, the camera related function may comprise uncovering a lens and the device may comprise a lens cover.

Additionally, the system may comprise a second wire coupled to the device. When power is supplied to the second wire, the second wire is configured to exert a force on the device to move the lens cover to cover the lens.

Additionally, the device may comprise a first member and a second member rotatably connected to the first member. When force is applied to the first member via the first wire, an upper portion of the first member may be configured to move in a first direction and the second member may be configured to move in a second direction opposite the first direction.

Additionally, the system may comprise a second wire coupled to the first member, wherein when force is applied to the first member via the second wire, an upper portion of the first member may be configured to move in the second direction and the second member may be configured to move in the first direction.

Additionally, the system may comprise a latch configured to secure the second member in a first position when force is applied to the first member via the wire and secure the second member in a second position when force is applied to the first member via the second wire.

Additionally, the first and second wires may comprise an alloy that contracts when the alloy is heated to a predetermined temperature.

Additionally, the device may include a lens and the camera related function may comprise moving the lens into an optical path of a camera.

Additionally, the device may include an infrared filter and the camera related function may comprise moving the infrared filter out of an optical path of a camera.

Additionally, the device may include at least one of an optical component or a filter and the camera related function may comprise at least one of inserting or removing the optical component or filter from an optical path of a camera.

Additionally, the system may comprise a switch coupled to the logic. The switch may be configured to receive an activation signal from the logic, wherein during assertion of the activation signal, the switch allows power from the power source to be supplied to the first wire.

Additionally, the system may comprise a first spring coupled to the first wire, the first wire exerting a force on the first spring when power is supplied to the first wire.

According to a further aspect, method performed by a camera device may include receiving a first selection associated with a first camera function and providing power to a first wire upon selection of a first camera function. The method may also include moving a lens cover or an optical component into an optical path of the camera in response to power being provided to the first wire.

Additionally, the method may include providing power to a second wire upon selection of a second camera function or upon powering down of the camera device. The method may further include moving the lens cover or the optical component out of the optical path of the camera in response to power being provided to the second wire.

According to still another aspect, a device may comprise means for moving a lens cover or an optical component into an optical path of a camera, where the means for moving includes a first wire. The device may also include means for receiving a first selection associated with a camera related function and means for providing power to the first wire in response to the first selection. Upon application of power to the first wire, the means for moving performs the camera related function.

Additionally, the device may further comprise means for securing the lens cover in a first position or a second position and means for protecting the device when the means for moving is impeded.

Other features and advantages of the invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference number designation may represent like elements throughout.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Figure 1A:
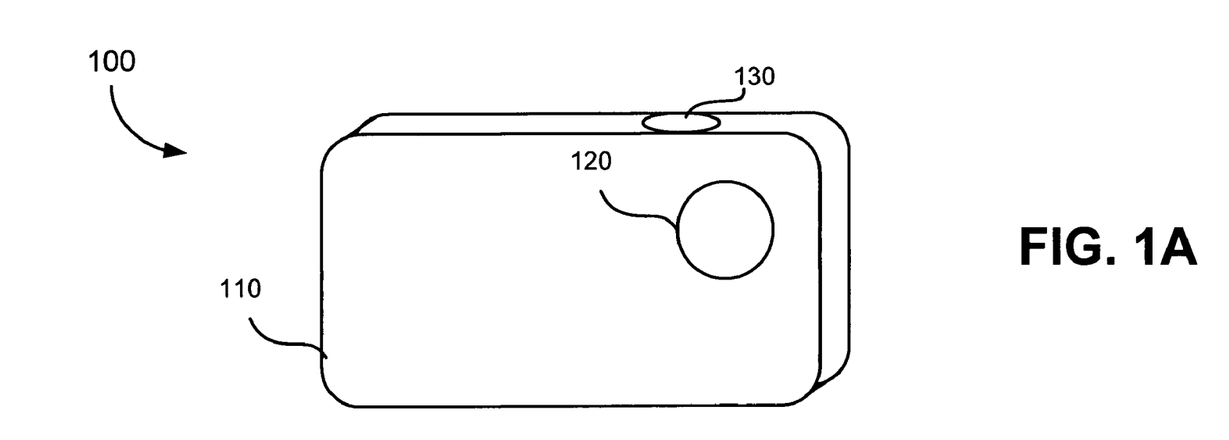
FIGS. 1A and 1B are diagrams of an exemplary mobile terminal in which methods and systems consistent with the invention may be implemented.
Figure 1B:
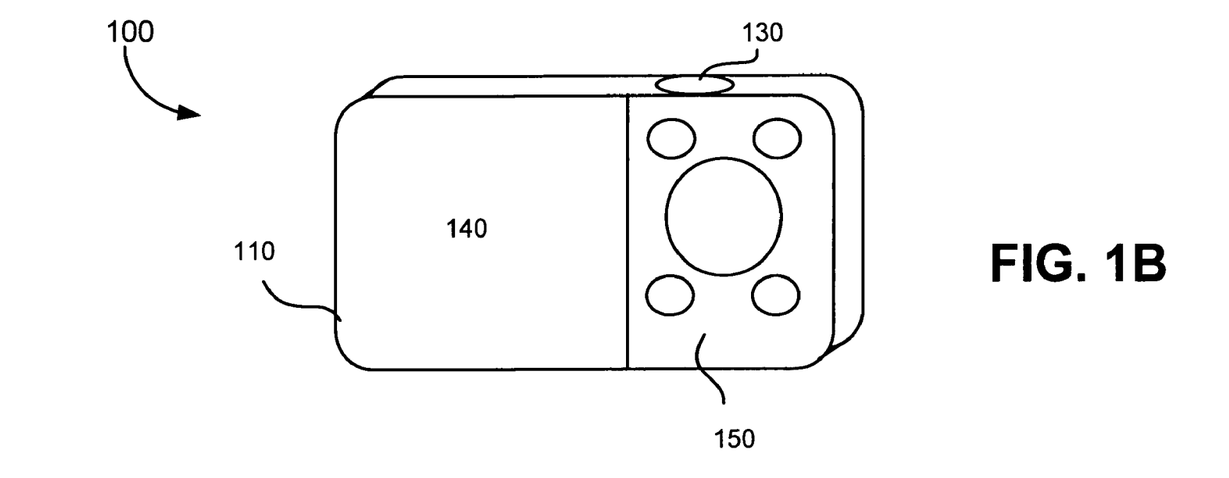

FIGS. 1A and 1B are front side and back side views of an exemplary mobile terminal 100 in which systems and methods consistent with the invention may be implemented. The invention is described herein in the context of a mobile terminal. As used herein, the term "mobile terminal" may include a cellular radiotelephone with or without a multi-line display; a Personal Communications System (PCS) terminal that may combine a cellular radiotelephone with data processing, facsimile and data communications capabilities; a personal digital assistant (PDA) that can include a radiotelephone, pager, Internet/Intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices. Mobile terminal 100 may also include a camera, as described in detail below. It should also be understood that the invention may also be implemented in other devices that include cameras or in a standalone camera that does not include other communication functionality.

Referring to FIG. 1A, mobile terminal 100 may include housing 110, lens 120 and shutter button 130. Housing 110 may protect the components of mobile terminal 100 from outside elements. Lens 120 may focus light and may include a number of lens elements. A lens cover (not shown) may be controlled to uncover lens 120 to permit the user to take pictures and cover lens 120 when the camera is not in use, as described in detail below. Shutter button 130 may be pressed by a user to take a picture.

FIG. 1B illustrates the back side of mobile terminal 100. Referring to FIG. 1B, mobile terminal 100 includes display screen 140 and user control area 150. Display screen 140 may be a liquid crystal display (LCD) or some other type of display screen that allows the user to view images that will be captured when the user takes a picture.

User control area 150 may include controls associated with placing telephone calls via mobile terminal 100. For example, user control area 150 may include a dial button, hang up button, etc. User control area 150 may also include a menu button that permits the user to view a menu associated with selecting functions, such as a camera function for mobile terminal 100.

Figure 2:
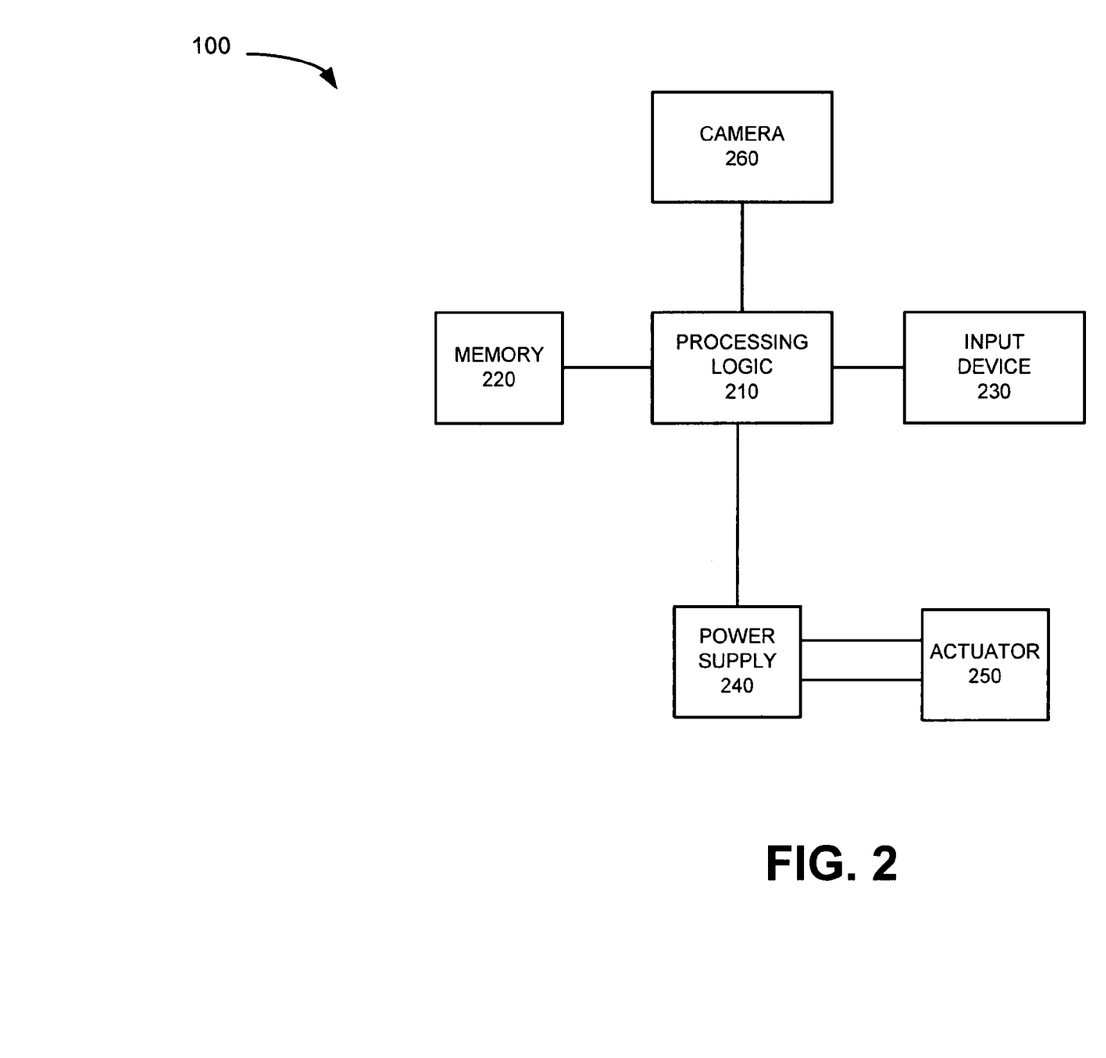
FIG. 2 is a diagram illustrating some components of the mobile terminal of FIGS. 1A and 1B according to an exemplary implementation consistent with the invention.

FIG. 2 is a diagram illustrating some components of mobile terminal 100 according to an exemplary implementation consistent with the invention. Mobile terminal 100 may include processing logic 210, memory 220, input device 230, power supply 240, actuator 250 and camera 260. One skilled in the art would recognize that the mobile terminal 100 may be configured in a number of other ways and may include other or different elements, such as one or more radio frequency (RF) antennas, a transceiver, modulator/demodulator, encoder/decoder, a display, a speaker, etc.

Processing logic 210 may include a processor, microprocessor, an application specific integrated circuit (ASIC), field programmable gate array (FPGA) or the like. Processing logic 210 may execute software programs or data structures to control operation of mobile terminal 100. Memory 220 may include a random access memory (RAM) or another type of dynamic storage device that stores information and instructions for execution by processing logic 210; a read only memory (ROM) or another type of static storage device that stores static information and instructions for use by processing logic 210; and/or some other type of magnetic or optical recording medium and its corresponding drive. Instructions used by processing logic 210 may also, or alternatively, be stored in another type of computer-readable medium accessible by processing logic 210. A computer-readable medium may include one or more memory devices and/or carrier waves.

Input device 230 may include any mechanism that permits an operator to input information to mobile terminal 100, such as a microphone, a keyboard, a keypad, a mouse, a pen, voice recognition and/or biometric mechanisms, etc. Input device 230 may also include a button, such as a button in user control area 150 (FIG. 1B) that allows a user to receive a menu of options via display screen 140. The menu may allow the user to select a camera mode. Alternatively, input device 230 may include a camera button located in user control area 150 that allows a user to activate a camera mode for mobile terminal 100.

Power supply 240 may supply power to components of mobile terminal 100, such as actuator 250. Actuator 250 may include a device or structure that can be used to perform one or more function associated with operation of mobile terminal 100, as described in detail below. For example, in one implementation, actuator 250 may be used to cover/uncover lens 120 (FIG. 1A).

Camera 260 may include conventional camera elements that enable mobile terminal 100 to take pictures. Camera 260 may store the pictures in, for example, memory 220 or in another memory. Camera 260 may also communicate with processing logic 210 to control various aspects with respect to taking pictures, as described in detail below.

Mobile terminal 100, consistent with the invention, may perform processing associated with, for example, taking pictures and performing functions associated with using camera 260. Mobile terminal 100 may perform these operations in response to processing logic 210 and/or camera 260 executing sequences of instructions contained in a computer-readable medium, such as memory 220. It should be understood that a computer-readable medium may include one or more memory devices and/or carrier waves. Execution of sequences of instructions contained in memory 220 causes processing logic 210 and/or camera 260 to perform acts that will be described hereafter. In alternative embodiments, hard-wired circuitry may be used in place of or in combination with software instructions to implement processes consistent with the invention. Thus, implementations consistent with the invention are not limited to any specific combination of hardware circuitry and software.

Figure 3A:
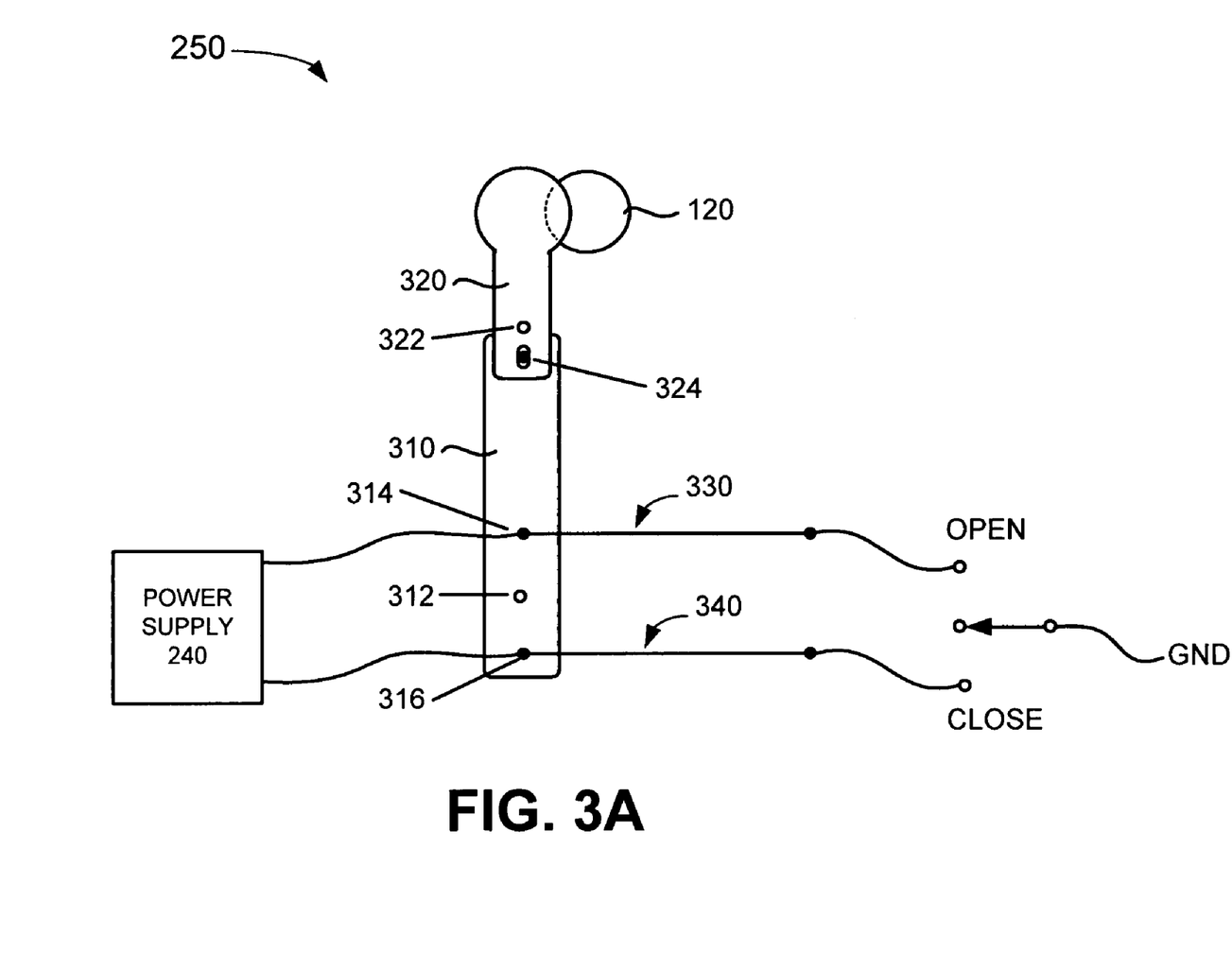
FIGS. 3A-3C are exemplary diagrams of an actuator consistent with the invention.

FIG. 3A is a diagram of actuator 250 in an exemplary implementation consistent with principles of the invention. Referring to FIG. 3A, actuator 250 includes member 310, member 320, wire 330 and wire 340. Member 310 may be rectangular shaped and may be made of, for example, a non-conductive material, such as a plastic material. Alternatively, member 310 may have other shapes and may be made of a conductive material. Using a conductive material for member 310 may facilitate the connections between the wires from power supply 240 and wires 330 and 340.

In one implementation, member 310 may have a length ranging from about 20 millimeters (mm) to about 25 mm and a width ranging from about 2 mm to about 4 mm. It should be understood that the particular size of member 310 may be larger or smaller based on the particular requirements associated with the function performed by actuator 250 and/or other design constraints, such as space constraints.

Member 310 may include pivot point 312 and terminals 314 and 316. Pivot point 312 may be connected to an underlying surface or device (not shown), such that when force is applied to member 310, member 310 rotates or moves with respect to pivot point 312, as described in detail below. Wire 330 and wire 340 may be connected to terminals 314 and 316, respectively, as illustrated in FIG. 3A. When power is applied to wire 330 and/or wire 340, the wire 330/340 may contract, thereby creating a pulling force on member 310, as described in more detail below.

Member 320 may have a rectangular shaped lower portion and a round or oval shaped upper portion, as illustrated in FIG. 3A. Member 320 may be made of, for example, a non-conductive material, such as a plastic material. It should be understood that member 320 may have other shapes and may be made of other materials in implementations consistent with the invention. In one implementation, member 320 may have a length ranging from about 14 mm to about 18 mm and a width at its lower portion ranging from about 2 mm to about 4 mm. The round or oval shaped upper portion may be sized to be slightly larger than, for example, lens 120. In one implementation, the diameter of the upper portion of member 320 may range from about 8 mm to about 10 mm. It should be understood that the particular size of member 320 may be larger or smaller based on the particular requirements associated with the function performed by actuator 250 and/or other design constraints, such as space constraints.

Member 320 may include pivot point 322 and may be connected to member 310 via connection point 324. Connection point 324 may be a fastener, such as a binding post and screw, a rivet or some other fastening mechanism that allows member 320 to rotate with respect to member 310. Pivot point 322 may be connected to an underlying surface or device (not shown), such that when force is applied to member 320, member 320 rotates or moves with respect to pivot point 322.

Wire 330 may be connected to terminal 314 and wire 340 may be connected to terminal 316. Wires 330 and 340 may also be supplied with power from power supply 240 via connections at terminals 314 and 316, as illustrated in FIG. 3A. Wires 330 and 340 may be supplied with power (i.e., the circuit path from power supply 240 through wires 330/340 to ground may be completed) based on the status of the connections/terminals labeled "open" and "close" in FIG. 3A. These connections may be controlled, for example, based on an operating mode associated with mobile terminal 100, such as whether mobile terminal 100 is operating in a camera mode, as described in detail below.

Wires 330 and 340 are used to exert forces on member 310 based on current/voltage applied to wires 330/340. For example, in one implementation, wires 330 and 340 are used to apply a predetermined force on member 310 to achieve movement of members 310 and 320 such that the top portion of member 320 covers/uncovers lens 120.

In an exemplary implementation, wires 330 and 340 may be fabricated from material that changes shape or size when the material is heated beyond a particular temperature. The particular temperature needed to change the shape/size depends on the particular material. In one implementation, wire 330 or wire 340 may be made of an alloy that is designed to contract (i.e., a fixed length becomes shorter) when wire 330/340 is heated beyond a threshold temperature. In addition, the alloy made be fabricated to have poor conductivity (e.g., have resistive characteristics). In this manner, when power is applied to wires 330/340, the wires become heated beyond the threshold temperature, thereby causing wires 330/340 to contract. In an exemplary implementation, wires 330 and 340 may include alloys made from nickel and titanium that are known as "muscle wire" or "memory alloy". For example, wires 330 and 340 may be fabricated using Nitinol, Flexinol or similar materials.

Wires 330 and 340, consistent with the invention, may contract about 3% to 5% when heated beyond a threshold temperature. In an exemplary implementation, the threshold temperature may range from about 88 to 98 degrees Celsius. Wires 330 and 340, consistent with the invention, may also relax (i.e., return to the pre-heated state) at a temperature ranging from about 62 degrees to 72 degrees Celsius.

Table 1 illustrates exemplary characteristics of wires 330 and 340 that may be used in implementations consistent with the invention.

TABLE 1

| Exemplary Wire Properties | | |
| --- | --- | --- |
| Wire Diameter (millimeters) | 0.05 | 0.125 |
| Resistance (ohms/meter) | 510 | 70 |
| Typical Power (watts/meter) | 1.28 | 4.4 |
| Contraction speed at typical power (seconds) | 1 | 1 |
| Maximum Recovery Force (grams) | 117 | 736 |
| Deformation Force (grams) | 8 | 43 |
| Heat Capacity (Joules/g) | 0.32 | 0.32 |

Figure 3B:
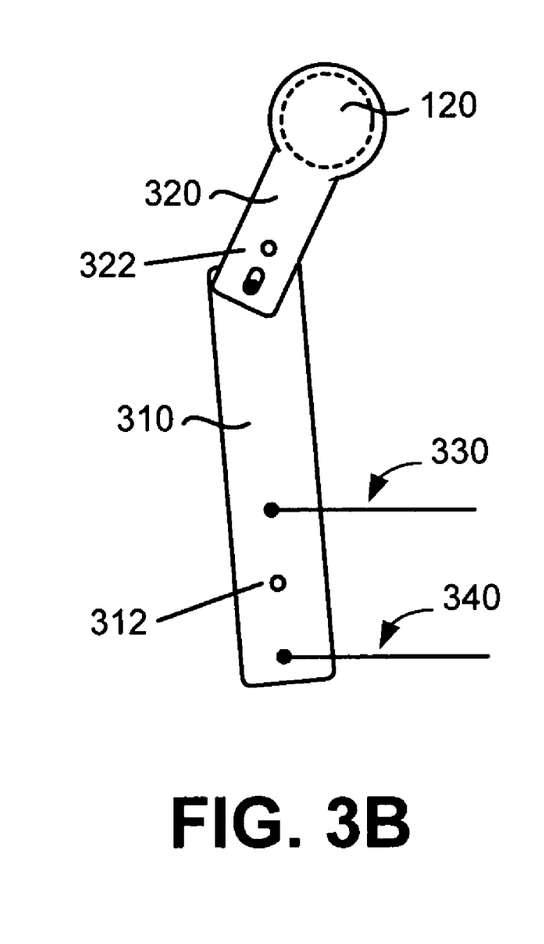

Wires 330 and 340, consistent with the invention, may be configured to exert forces to pull member 310 with respect to pivot point 312. For example, when power from power supply 240 is supplied to wire 340 (i.e., the path through the "close" terminal in FIG. 3A goes to ground), wire 340 is heated beyond the threshold temperature and contracts, thereby creating a pulling force on member 310 at terminal 316. Member 310 may then move in a first direction with respect to pivot point 312, as illustrated in FIG. 3B. When member 310 moves in the first direction, member 320 rotates with respect to pivot point 322 and moves in the opposite direction as the top portion of member 310, thereby moving the round portion of member 320 over lens 120, as illustrated in FIG. 3B. In this manner, actuator 250 acts as a lens cover when power is supplied to wire 340.

Figure 3C:
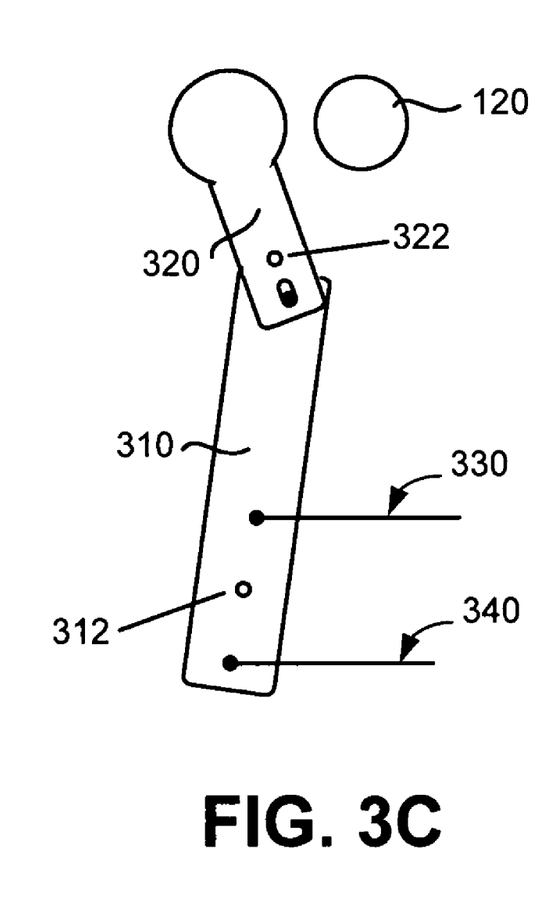

When power from power supply 240 is supplied to wire 330 (i.e., the path though the "open" terminal in FIG. 3A goes to ground), wire 330 is heated beyond the threshold temperature and contracts, thereby creating a pulling force on member 310 at terminal 314. In this case, member 310 may be pulled in a first direction with respect to pivot point 312, as illustrated in FIG. 3C. When member 310 moves in the first direction, member 320 rotates with respect to pivot point 322 and moves in the opposite direction as the top portion of member 310, as illustrated in FIG. 3C, thereby moving the round portion of member 320 away from lens 120. In this manner, actuator 250 acts to uncover lens 120.

Wires 330 and 340, consistent with the invention, may be used in lengths that provide determined amounts of force on member 310 to effect the desired movement of member 320. One of ordinary skill in the art would be able to select the desired wires and characteristics of the wires, such as the heat capacity, resistance, power requirements, etc., to effect the desired movement of actuator 250 based on the guidance given herein and the particular application associated with actuator 250. By using actuator 250 illustrated in FIG. 3A, a relatively small force exerted on member 310 at terminal 314 or terminal 316 allows member 320 to move the necessary distance to perform the desired function.

As described above, wires 330 and 340 may be heated by applying electrical power. In an exemplary implementation, wires 330 and 340 can be driven with steady state currents or variable currents. In one implementation, wires 330 and 340 may be provided with power under control of processing logic 210 to provide desired amounts of heating to wires 330 and 340, to allow desired amounts of cooling of wires 330/340 and to provide power control for causing rapid movement of actuator 250.

Figure 4:
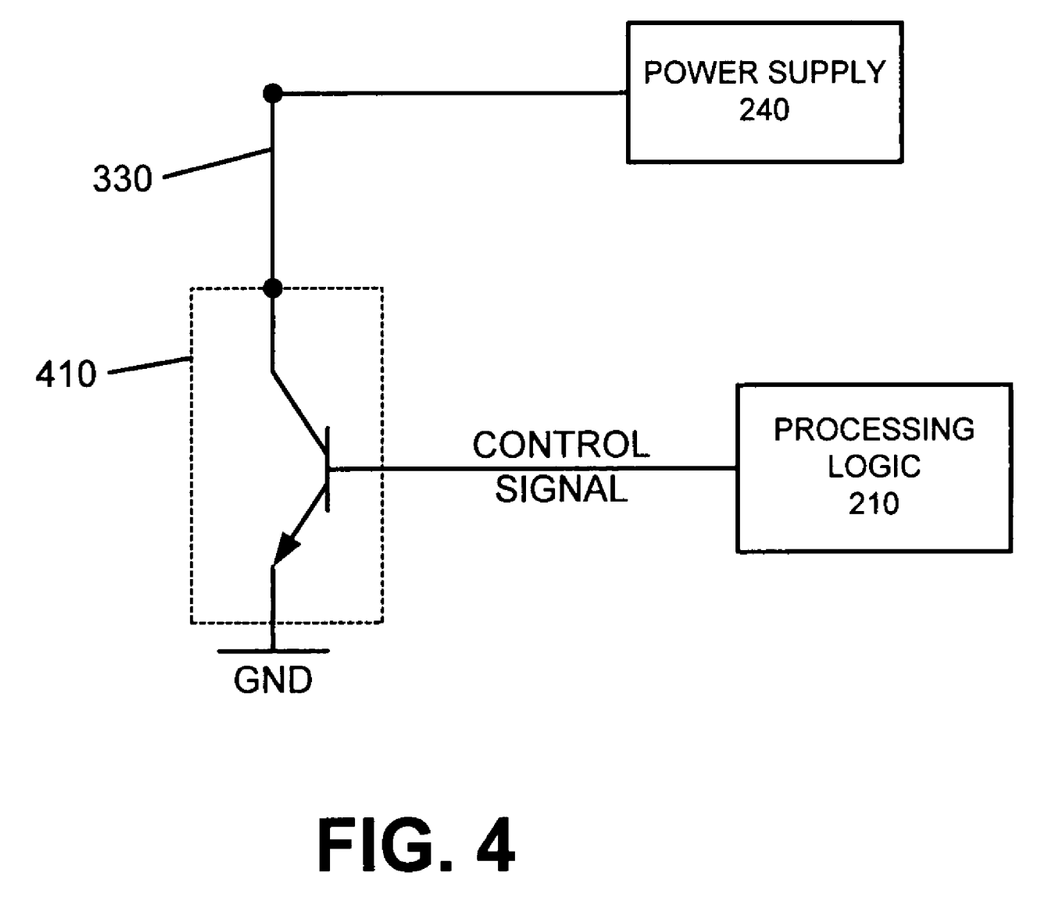
FIG. 4 is a diagram illustrating an exemplary system for supplying power to the actuator consistent with the invention.

FIG. 4 is a diagram illustrating an exemplary system for providing power to wire 330 in an implementation consistent with the invention. A system for providing power to wire 340 may be configured in a similar manner. Referring to FIG. 4, transistor switch 410 may be coupled to wire 330 and may also be coupled to processing logic 210. Power supply 240 may also be coupled to wire 330. In an exemplary implementation, power supply 240 may provide, for example, 5 volts to wire 330. Processing logic 210 may provide a control signal to switch 410 based on the particular operating mode associated with mobile terminal 100. For example, when in a camera mode, processing logic 210 may send a control signal to transistor switch 410 to create a conductive path from power supply 240 through switch 410 to ground. The control signal from processing logic 210 may be a pulse width modulated signal that allows the duration of the pulse to be set based on the particular system requirements. In this manner, power is supplied to actuator wire 330 under control of processing logic 210 to allow actuator wire 330 to be heated to the threshold temperature. Power may be supplied to wire 340 in a similar manner (i.e., under control of processing logic 210 via a transistor switch).

In one exemplary implementation in which wire 330/340 is a 2×20 mm wire with a diameter of 0.07 mm and the resistance of each wire is about 10 ohms, the control signal from processing logic 210 to switch 410 may be provided for a duration of about 70 milliseconds. A current of about 350 milliamps may then be created on wire 330/340 to achieve the desired heating of wire 330/340. In some implementations, a lower current may be provided. In such cases, slower movement of member 320 may occur since wire 330/340 will be heated more slowly. Alternatively, if faster movement of member 320 is required, higher currents may be provided that allow wires 330 and 340 to be heated more quickly based on the particular system requirements. In this manner, processing logic 210 may control the application of power to wires 330/340 based on the particular operating mode and the particular system requirements.

Figure 5:
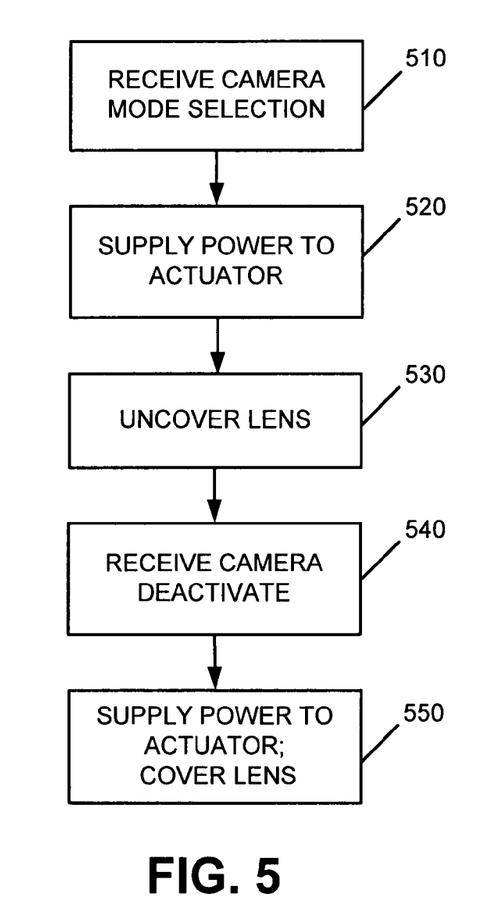
FIG. 5 is a flow diagram illustrating exemplary processing associated with the actuator of FIG. 3A consistent with the invention.

FIG. 5 is a flow diagram illustrating exemplary processing associated with actuator 250 in an implementation consistent with the invention. Assume that mobile terminal 100 is powered up and that the user wishes to take a picture with camera 260 included in mobile terminal 100.

In one implementation, after mobile terminal 100 powers up, the user of mobile terminal 100 may wish to activate a camera mode of mobile terminal 100 in order to take pictures. The user may initiate the camera mode via, for example, input device 230 (FIG. 2). For example, the user may press a menu button in user control area 150 (FIG. 1B) to receive a menu of options. One of the options may be a camera mode. Alternatively, input device 230 may include a camera button located in user control area 150 that allows a user to select a camera mode. In either case, assume that the user selects the camera mode. Processing logic 210 may receive the camera mode selection (act 510).

After receiving the camera mode selection, processing logic 210 may determine that the camera option has been selected. Processing logic 210 may then control power supply 240 to supply power to actuator 250 (act 520). For example, upon receiving the camera mode selection, processing logic 210 may send a control signal to transistor switch 410 to close switch 410 and to allow power supply 240 to supply power to wire 330, as described above with respect to FIG. 4. Wire 330 may then be heated beyond the threshold and may contract. Wire 330 may then exert a force on member 310, which causes member 320 to move away from lens 120, as illustrated in FIG. 3C (act 530). In this manner, upon selection of the camera mode, processing logic 210 controls actuator 250 to allow lens 120 to receive light and allow camera 260 to take pictures.

Assume that the user has taken the desired number of pictures and wishes to shut down the camera mode. In this scenario, the user may select the camera function from the menu and may deactivate the camera function. Alternatively, the user may press a camera mode button in user control area 150 to deactivate the camera mode. In either case, processing logic 210 may receive the deactivate camera mode selection (act 540).

After receiving the camera mode deactivate selection, processing logic 210 may then control power supply 240 to supply power to actuator 250 to cover the lens (act 550). For example, upon receiving the camera mode deactivation selection, processing logic 210 may send a control signal to a transistor switch similar to switch 410 to close the switch and to allow power supply 240 to supply power to wire 340, as described above with respect to FIG. 4. Wire 340 may then be heated beyond the threshold and may contract. Wire 340 may then exert a force on member 310, which causes member 320 to move over lens 120, as illustrated in FIG. 3B (act 550). In this manner, actuator 250 operates as a lens cover to cover/uncover lens 120 based on whether the user of mobile terminal 100 wishes to take pictures.

In some implementations, mobile terminal 100 may be configured to automatically cover lens 120 upon powering down, even if the user does not deactivate the camera before powering down. In this case, power is supplied to wire 340, as described above, to cover lens 120. Lens 120 will then be covered when mobile terminal 100 is not in use.

The implementation described above is directed to using actuator 250 as a lens cover. It should be understood that actuator 250 may be used to perform other functions. For example, in one alternative implementation, the upper portion of member 320 may be replaced by a positive lens or a negative lens, based on the desired design. The optical power of the lens can be chose to be a macro lens to permit close up photos. In this manner, actuator 250 may be used to provide a normal lens or a special lens based on the movement of actuator 250. In still another implementation, the optical power of the lens can be chosen to extend the close functioning range of the camera in such a way that it becomes a two-step autofocus solution. In this case, actuator 250 may include a lens that may be automatically controlled by processing logic 210 to assist in an autofocus function.

In another alternative, the upper portion of member 320 of actuator 250 may be replaced by an infrared cutoff filter, as opposed to a lens cover or a particular lens. Such a filter is normally incorporated into the camera design since a sensor included in camera 260 is typically sensitive to infrared radiation which would disturb color rendition. In this implementation, when member 320 of actuator 250 swings the cutoff filter away from lens 120, the camera may function as a night vision camera. The sensor sensitivity in the infrared part of the spectrum is much higher than in the visible spectrum. Thus, camera 260 can be used in darker environments, especially if a tungsten type light source (even a weak source) is present. In this implementation, an infrared emitting diode can serve as a lamp. As the sensor in camera 260 may be very sensitive to infrared radiation, a low power infrared diode can illuminate a scene at quite a long distance, as compared to white light emitting diodes (LEDs) used in ordinary color photography. Therefore, in this implementation, actuator 250 may be used to facilitate night vision photography.

The above described implementation associated with night vision photography and using actuator 250 to move an infrared cutoff filter into/out of an optical path of camera 260 is just one example of a type of filter that may be used with actuator 250. It should be understood that actuator 250 may insert/remove any type of filter and/or optical component (e.g., lens) from an optical path of camera 260 in alternative implementations associated with actuator 250. In this manner, actuator 250 may be used to enhance the functionality of a camera based on the particular system requirements.

In an exemplary implementation consistent with the invention, the actuator may include a latching mechanism and/or a protection mechanism, as described in detail below. The latching and protection mechanisms help provide additional reliability and protection with respect to the use of the actuator, as described below.

Figure 6:
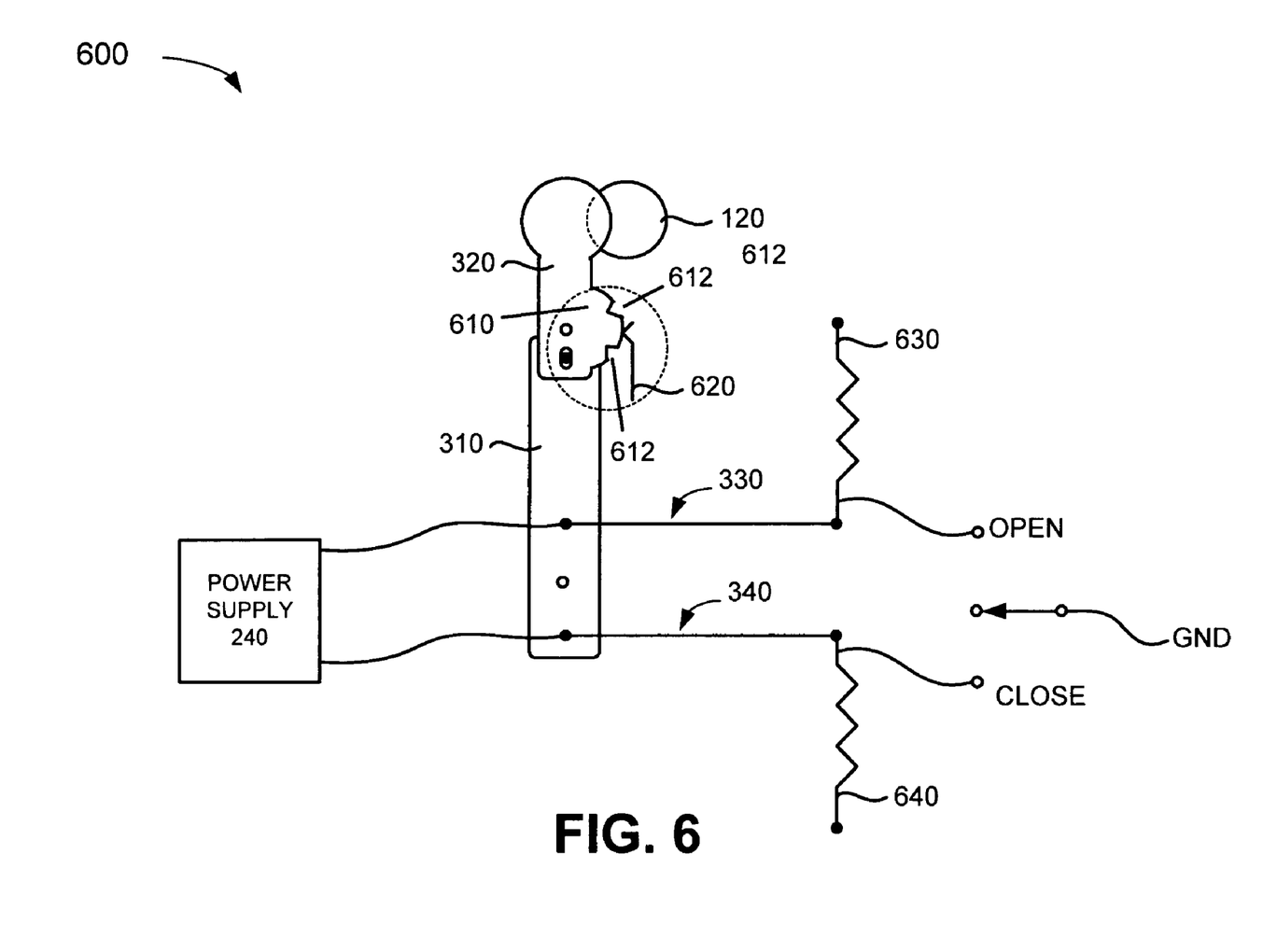
FIG. 6 is a diagram illustrating another exemplary actuator consistent with the invention.

FIG. 6 illustrates an exemplary actuator 600 consistent with the invention. Referring to FIG. 6, actuator 600 may include similar elements as actuator 250 described above. In addition, actuator 600 may include a latching mechanism, illustrated within the dashed circle in FIG. 6. Actuator 600 may also include a spring 630 coupled to wire 330 and a spring 640 coupled to wire 640, as also illustrated in FIG. 6.

The latching mechanism illustrated in FIG. 6 may enable member 320 to latch into a secure open or close position. For example, referring to FIG. 6, the lower portion of member 320 may include a round or wheel-like protrusion 610 that includes a number of notches 612 and a latch 620. Notches 612 may be designed to receive the upper portion of latch 620 such that member 320 is secured. For example, when force is applied to wire 330, protrusion 610 may move in a counter-clockwise direction. The lower notch 612 illustrated in FIG. 6 may then latch into the upper portion of latch 620. In this manner, when in the "open" position, member 320 may be secured so that it will not move back into a closed or partially closed position. Similarly, when force is applied to wire applied to wire 340, protrusion 610 may move in a clockwise direction and the upper notch 612 illustrated in FIG. 6 may latch with the upper portion of latch 620. In this manner, when in the "close" position, member 320 may be secured so that it will not move back into the open or partially opened position.

Actuator 600 may also include a protection mechanism for protecting actuator 600 and the user. For example, referring to FIG. 6, wire 330 may be connected to spring 630 and wire 340 may be connected to spring 640, as opposed to being connected to fixed points. Springs 630 and 640 may have a preloaded tension based on the particular actuator 600 requirements. Assume that an object interferes with the operation of member 320 (e.g., the user sticks his/her finger in the opening over lens 120) when actuator 600 is intended to be in the close position (i.e., power is applied to wire 340). In this case, the force on wire 340 may cause spring 640 to bend, thereby dissipating some of the force on wire 340. This may prevent actuator 600 from breaking.

For example, in situations where member 320 cannot move due to an obstruction over lens 120, wire 340 may pull away from a fixed point, such as a connection to transistor switch 410, if the wire is unable to dissipate the force on wire 340. In this implementation, the force on wire 340 may be dissipated on one end by bending spring 640. This may enable the force on the remaining portion of wire 340 to be dissipated over the length of wire 340, thereby eliminating most or all of the force on member 310. Since the force on member 310 may be substantially reduced or eliminated in this manner, the force on the upper portion of member 320 may be substantially reduced or eliminated. This may ensure that member 320 does not attempt to close when an obstruction is present. Therefore, spring 640 may serve as a safety mechanism for a user. That is, by bending spring 640 and eliminating force on member 320, member 320 will not close on a user's finger.

Similar actions may be performed when force is exerted on wire 330 and an obstruction prevents member 320 from opening. That is, the force on wire 330 may bend spring 630, thereby substantially reducing or eliminating the force on member 320.

Using springs 630 and 640 may also be beneficial when the actuator is subjected to extreme temperature conditions. For example, if mobile terminal 100 is subjected to extreme heat conditions (i.e., above the threshold temperatures of wires 330 and 340) that cause wires 330 and 340 to simultaneously contract, the forces on wires 330 and 340 may bend springs 630 and 640, respectively. This may prevent damage to actuator 600.

CONCLUSION

Implementations consistent with the invention allow camera-related functions to be performed in an efficient manner by using an actuator that is able to be easily incorporated into various devices. This may allow, for example, cellular telephone designers to incorporate various functions that otherwise would not be included in mobile terminals or to incorporate various functions in a manner that does not require manual or external controls.

The foregoing description of the embodiments of the invention provides illustration and description, but is not intended to be exhaustive or to limit the invention to the precise form disclosed. Modifications and variations are possible in light of the above teachings or may be acquired from practice of the invention.

For example, the invention has been described in the context of a mobile terminal that includes a camera. The invention, however, may be used in other devices, such as in a standalone camera that does not also function as a cellular telephone.

In addition, the invention has been described with respect to a particular actuator that includes two wires coupled to a first member that is connected to a second member. In alternative implementations, other configurations may be used. For example, an actuator that includes a single member and/ or single wire may be used. In this implementations, the single wire may contract and move, for example, a lens cover away from the lens. When the wire relaxes, the lens cover may move back over the lens.

Additionally, aspects of the invention have been described above as using springs to prevent damage to the actuator when an obstruction is present. It should be understood that other protection mechanisms that dissipate the force on the wires may be used in alternative implementations.

Further, while a series of acts has been described with respect to FIG. 5, the order of the acts may be varied in other implementations consistent with the invention. Moreover, non-dependent acts may be performed in parallel.

It will also be apparent to one of ordinary skill in the art that aspects of the invention, as described above, may be implemented in cellular communication devices/systems, methods, and/or computer program products. Accordingly, the present invention may be embodied in hardware and/or in software (including firmware, resident software, micro-code, etc.). Furthermore, aspects consistent with the invention may take the form of a computer program product on a computer-usable or computer-readable storage medium having computer-usable or computer-readable program code embodied in the medium for use by or in connection with an instruction execution system. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit or a field programmable gate array, software, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A system for use with a mobile terminal that includes a camera, comprising:
    a first member comprising a first pivot point and a rotatable connection point;
    a first wire connected to the first member at a first point located between the first pivot point and the rotatable connection point;
    a second wire connected to the first member at a second point, where the first pivot point is located between the first point and the second point;
    a second member coupled to the first member via the rotatable connection point and comprising a second pivot point; and
    a power source to supply power to at least the first wire,
    where when power is supplied to at least the first wire, the first wire is to exert a force on the first member to cause the first member to rotate about the first pivot point and to cause the second member to rotate about the second pivot point to perform a function associated with the camera.

2. The system of claim 1, where the function comprises covering or uncovering a lens and the second member includes a lens cover.

3. The system of claim 1, where the second member is to:
    move to uncover a lens of the camera when power is supplied to the first wire, and
    move to cover the lens when power is supplied to the second wire.

4. The system of claim 1, further comprising:
    a processor to:
    control the power source to supply power to the first wire to uncover a lens when a camera mode of the mobile terminal is selected, and
    control the power source to supply power to the second wire to cover the lens when the camera mode is deactivated or when a user powers down the mobile terminal.

5. The system of claim 1, further comprising:
    at least one switch; and
    a processor coupled to a first one of the at least one switch, where the processor is to provide a control signal to the first switch to control application of power from the power source to the first wire.

6. The system of claim 1, where the the first wire and the second wire comprise an alloy that contracts when the alloy is heated to a predetermined temperature.

7. The system of claim 1, where the function comprises a macro function or an autofocus function and the second member includes a lens.

8. The system of claim 1, where the function comprises a night vision function and the second member includes a filter.

9. The system of claim 1, further comprising:
a latching device to:
secure the second member in a first position when power is applied to the first wire, and
secure the second member in a second position when power is applied to the second wire.

10. The system of claim 1, further comprising:
at least one safety device coupled to the at least one of the first wire and the second wire, where the safety device is to dissipate force when the function associated with the camera cannot be performed.

11. A system, comprising:
a processor to receive information corresponding to a selection of a camera related function;
a first member comprising a pivot point and a rotatable connection point;
a first wire connected to the first member at a first point located between the pivot point and the rotatable connection point;
a second wire connected to the first member at a second point, where the pivot point is located between the first point and the second point;
a second member coupled to the first member via the rotatable connection point; and
a power source to supply power to the first wire under control of the processor,
where when power is supplied to the first wire, the first wire is to exert a force on the first member to move the first member in a first direction to move the second member in a second direction and perform the camera related function.

12. The system of claim 11, where the camera related function comprises uncovering a lens and the second member comprises a lens cover.

13. The system of claim 12,
where when power is supplied to the second wire, the second wire is to exert a force on the first member to move the second member to move the lens cover to cover the lens.

14. The system of claim 13, further comprising:
a latch to:
secure the second member in a first position when force is applied to the first member via the first wire, and
secure the second member in a second position when force is applied to the first member via the second wire.

15. The system of claim 13, where the first and second wires comprise an alloy that contracts when the alloy is heated to a predetermined temperature.

16. The system of claim 13, where the second member includes a lens and the camera related function comprises moving the lens into an optical path of a camera.

17. The system of claim 13, where the second member includes an infrared filter and the camera related function comprises moving the infrared filter out of an optical path of a camera.

18. The system of claim 13, where the second member includes at least one of an optical component or a filter and the camera related function comprises at least one of inserting or removing the optical component or filter from an optical path of a camera.

19. The system of claim 13, further comprising:
a switch coupled to the processor, where the switch is to receive an activation signal from the processor, where during assertion of the activation signal, the switch allows power from the power source to be supplied to the first wire.

20. The system of claim 13, further comprising:
a first spring coupled to the first wire, the first wire exerting a force on the first spring when power is supplied to the first wire.

21. A method performed by a camera device, comprising:
receiving a first selection associated with a first camera function;
providing power to a first wire upon selection of the first camera function, where the first wire causes a first member to rotate about a first pivot in a first direction to cause a second member, coupled to the first member through a rotatable connection and comprising a lens cover or an optical component, to rotate about a second pivot in a second direction; and
moving the lens cover or the optical component into an optical path of the camera device in response to power being provided to the first wire.

22. The method of claim 21, further comprising:
providing power to a second wire upon selection of a second camera function or upon powering down of the camera device, where the second wire causes the first member to rotate about the first pivot in the second direction to cause the second member to rotate about the second pivot in the first direction; and
moving the lens cover or the optical component out of the optical path of the camera in response to power being provided to the second wire.

23. A device, comprising:
means for moving a lens cover or an optical component into an optical path of a camera, the means for moving including a first wire;
means for receiving a first selection associated with a camera related function; and
means for providing power to the first wire in response to the first selection, where upon application of power to the first wire, the first wire causes a first member to rotate about a first pivot in a first direction to cause a second member, coupled to the first member through a rotatable connection, to rotate about a second pivot in a second direction to perform the camera related function.

24. The device of claim 23, further comprising:
means for securing the lens cover in a first position or a second position; and
means for protecting the device when the means for moving is impeded.

* * * * *

UNITED STATES PATENT AND TRADEMARK OFFICE
CERTIFICATE OF CORRECTION

PATENT NO. : 7,699,543 B2
APPLICATION NO. : 11/357179
DATED : April 20, 2010
INVENTOR(S) : Mats Wernersson It is certified that error appears in the above-identified patent and that said Letters Patent is hereby corrected as shown below:

Column 13, line 45, after "claim" delete "13" and insert --11--.

Column 13, line 52, after "claim" delete "13" and insert --11--.

Column 13, line 55, after "claim" delete "13" and insert --11--.

Column 13, line 58, after "claim" delete "13" and insert --11--.

Column 14, line 1, after "claim" delete "13" and insert --11--.

Column 14, line 6, after "claim" delete "13" and insert --11--.

Column 14, line 12, after "claim" delete "13" and insert --11--.

Signed and Sealed this

First Day of June, 2010

David J. Kappos
*Director of the United States Patent and Trademark Office*